(12) United States Patent
Wolgemuth

(10) Patent No.: US 11,936,196 B2
(45) Date of Patent: Mar. 19, 2024

(54) FAILSAFE SAFETY CIRCUITS FOR PROTECTION FROM FAULTS OR LOSS OF RECTIFICATION CONTROL DURING WIRELESS POWER TRANSFER

(71) Applicant: InductEV Inc., King of Prussia, PA (US)

(72) Inventor: John Miller Wolgemuth, Chester Springs, PA (US)

(73) Assignee: InductEV Inc., King of Prussia, PA (US)

( * ) Notice: Subject to any disclaimer, the term of this patent is extended or adjusted under 35 U.S.C. 154(b) by 369 days.

(21) Appl. No.: 16/952,933

(22) Filed: Nov. 19, 2020

(65) Prior Publication Data

US 2021/0328443 A1    Oct. 21, 2021

Related U.S. Application Data

(60) Provisional application No. 63/010,771, filed on Apr. 16, 2020.

(51) Int. Cl.
*H02J 50/12* (2016.01)
*H02J 7/00* (2006.01)
(Continued)

(52) U.S. Cl.
CPC ............ *H02J 50/12* (2016.02); *H02J 7/0029* (2013.01); *H02J 7/02* (2013.01); *H01F 38/14* (2013.01); *H02J 7/00309* (2020.01)

(58) Field of Classification Search
CPC ........ H02J 7/0029; H02J 7/02; H02J 7/00309; H02J 50/12; H01F 38/14
(Continued)

(56) References Cited

U.S. PATENT DOCUMENTS

| 5,045,770 A * | 9/1991 | Brooks | G06K 19/0715 323/223 |
| 2008/0212345 A1* | 9/2008 | Yamashita | H02J 7/04 363/50 |

(Continued)

FOREIGN PATENT DOCUMENTS

CN    111712992 A  *  9/2020   ............ H02J 50/12

OTHER PUBLICATIONS

International Application No. PCT/US2020/67339, International Search Report and Written Opinion of the National Searching Authority, dated Mar. 23, 2021, 18 pages.

*Primary Examiner* — Richard Isla
*Assistant Examiner* — Manuel Hernandez
(74) *Attorney, Agent, or Firm* — Culhane Meadows PLLC; Michael P. Dunnam

(57) ABSTRACT

A magnetic inductive resonance charging circuit includes a resonant network having an inductive secondary coil that converts a magnetic field received from an inductive primary coil into an alternating current (AC) signal and a synchronous rectifier that rectifies the AC signal to generate a direct current (DC) signal for application to a load. The synchronous rectifier includes a variety of configurations for shunting the AC waveform of an AC current source in the event of a fault. For example, a rectifier controller may hold a pair of normally open switches of the rectifier off and a pair of normally closed switches of the rectifier on to shunt the AC current source when an over-voltage, over-current fault condition or an over-temperature fault condition is detected. Configurations are provided for grounding the capacitive electromagnetic interference produced in the chassis of an electric vehicle when the resonant network is unbalanced.

14 Claims, 9 Drawing Sheets

Figure 1:
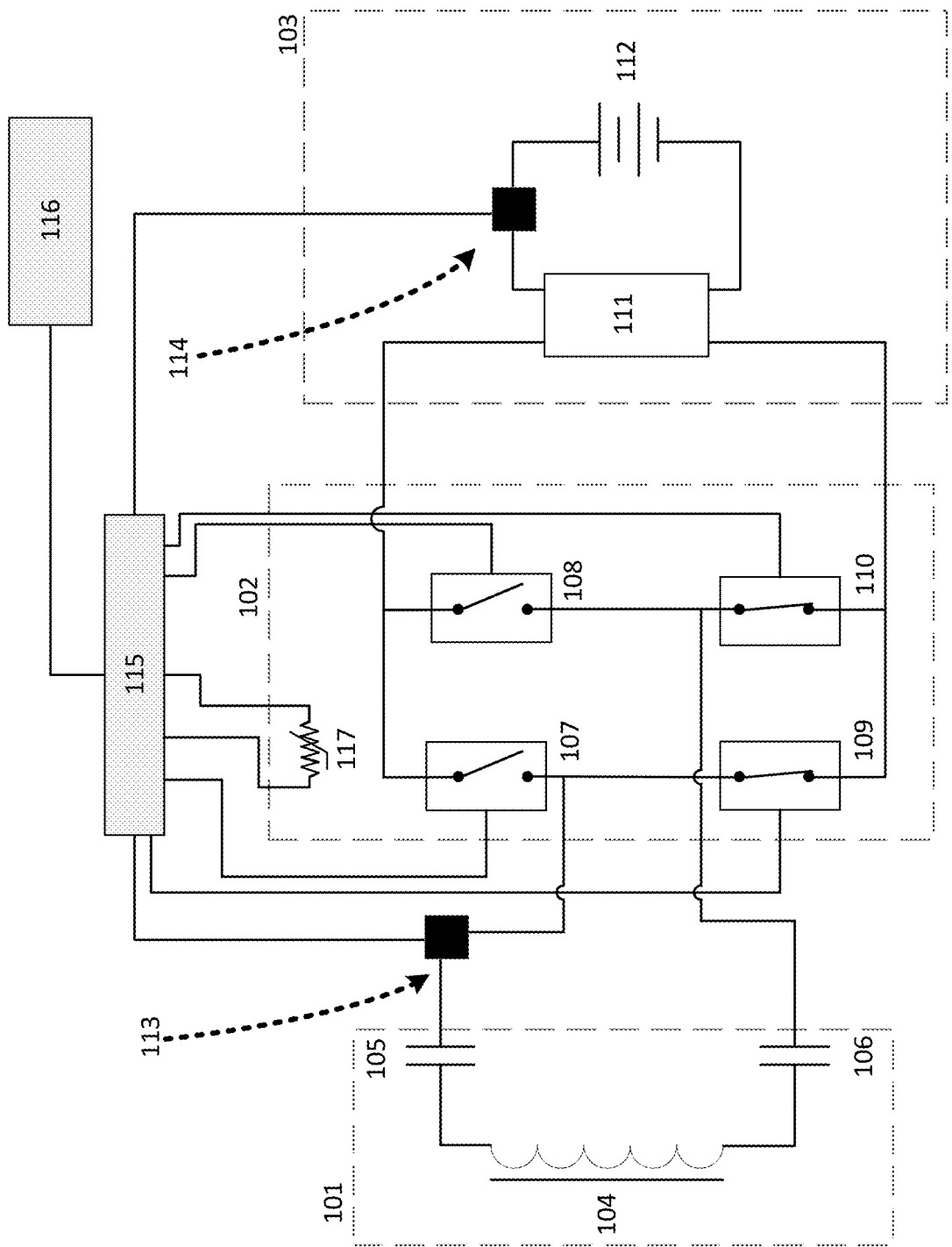

(51) Int. Cl.
    *H02J 7/02*    (2016.01)
    *H01F 38/14*    (2006.01)
(58) Field of Classification Search
    USPC .......................................... 320/108; 307/104
    See application file for complete search history.

(56) References Cited

U.S. PATENT DOCUMENTS

| | | |
|---|---|---|
| 2010/0164296 A1 | 7/2010 | Kurs et al. |
| 2013/0289334 A1* | 10/2013 | Badstibner .............. H02J 50/90 |
| | | 307/104 |
| 2015/0207333 A1* | 7/2015 | Baarman ............... H02J 50/001 |
| | | 307/104 |
| 2015/0263511 A1* | 9/2015 | Sandner ............... H02H 7/1252 |
| | | 363/53 |
| 2016/0025821 A1 | 1/2016 | Widmer et al. |
| 2016/0254659 A1* | 9/2016 | Chambon .............. H02H 3/202 |
| | | 320/108 |
| 2016/0294221 A1 | 10/2016 | Maniktala |
| 2017/0187230 A1* | 6/2017 | Tschirhart ............... H02J 50/12 |
| 2017/0346343 A1 | 11/2017 | Atasoy et al. |
| 2018/0040416 A1* | 2/2018 | Lestoquoy ............. H01F 27/38 |
| 2019/0084433 A1 | 3/2019 | Wang et al. |
| 2019/0148065 A1* | 5/2019 | Naruse .................... B60L 53/12 |
| | | 307/104 |
| 2019/0157907 A1* | 5/2019 | Sugiyama ............... H02J 50/80 |
| 2019/0386518 A1* | 12/2019 | de Rooij ................. H02J 50/12 |
| 2020/0287382 A1* | 9/2020 | Gao ........................ H02J 50/10 |

* cited by examiner

PRIOR ART

FAILSAFE SAFETY CIRCUITS FOR PROTECTION FROM FAULTS OR LOSS OF RECTIFICATION CONTROL DURING WIRELESS POWER TRANSFER

CROSS-REFERENCE TO RELATED APPLICATION

This patent application claims the benefit of U.S. Provisional Patent Application No. 63/010,771, filed Apr. 16, 2020, by John Wolgemuth, and titled "Safety Circuits for Wireless Power Transfer," which is hereby incorporated by reference in its entirety.

TECHNICAL FIELD

This disclosure relates to the transmission of electrical energy by means of resonant induction. More specifically, this disclosure relates to system design, circuit architecture, and implementation details of safety circuits that maximize the safety of a high-power wireless power transfer system.

BACKGROUND

Inductive power transmission has many important applications spanning many industries and markets. Use of inductive power transmission to charge electrical storage, such as batteries, is increasingly common in low-power portable consumer devices.

A transfer of power between coils using magnetic resonance is well known. An alternating current in the primary (aka transmitter) coil creates a magnetic field that propagates via an air-gap to cause a corresponding, opposing current in the secondary (aka receiver) coil as described by Faraday's law of induction and Lenz's Law. To charge a battery, the induced alternating current (AC) is converted to direct current (DC). A rectifier converts the alternating current (AC), which periodically reverses direction, to direct current (DC), which flows in only one direction.

Dependent on the AC frequency, desired DC voltage, or desired efficiency, either passive (diode-based) or active (MOSFET or switch-based) rectifiers may be used. Rectifiers typically require additional circuitry for producing a uniform steady voltage and/or voltage level (DC/DC) conversion necessary for battery charging.

As the desire for faster charging increases, the need to charge at higher power leads to the use of higher voltages and higher currents. Due to the increased safety hazards of high current and voltage sources, safety circuits are desired to decrease the likelihood of an electric shock.

SUMMARY

Various details for the embodiments of the inventive subject matter are provided in the accompanying drawings and in the detailed description text below. The systems and methods described herein provide increased safety from electrical shock during wireless power transfer by providing mechanisms to shunt the power in the event of a fault. In sample embodiments, a magnetic inductive resonance charging circuit is provided that includes a resonant network comprising an inductive secondary coil that converts a magnetic field received from an inductive primary coil into an alternating current (AC) signal, and a synchronous rectifier that rectifies the AC signal to generate a direct current (DC) signal for application to a load to be charged. The synchronous rectifier further includes means for shunting the AC waveform in the event of a fault. In an example configuration, the secondary coil is mounted on an electric vehicle and the load is a battery of the electric vehicle.

In a sample embodiment, the resonant network includes first and second balanced capacitors connected in series to respective ends of the secondary coil whereby the AC signal series resonates with the first and second capacitors. The synchronous rectifier may comprise a pair of normally open switches and a pair of normally closed switches where one of the pair of normally open switches and one of the pair of normally closed switches is connected to the first balanced capacitor and another of the pair of normally open switches and another of the pair of normally closed switches is connected to the second balanced capacitor. The means for shunting comprises the normally closed switches shunting the secondary coil in the event of a fault. The normally open switches are configured to prevent shorting of the load in the event of a fault. Signal conditioning circuitry may also be provided to condition the DC signal into a conditioned DC signal for application to the load.

In sample embodiments, a first current and voltage sensor may be provided to monitor the AC signal input into the synchronous rectifier from the resonant circuit and a second current and voltage sensor may be provided to monitor the conditioned DC waveform applied to the load. A rectifier controller responsive to values measured by the first current and voltage sensor and the second current and voltage sensor may phase lock to the AC signal output by the resonant network and provide control signals that control the switching of the pair of normally open switches and the pair of normally closed switches in response to the measured values. A temperature sensor may also be provided that detects an over-temperature fault condition of the synchronous rectifier and provides a detection signal to the rectifier controller.

In other sample embodiments, the charging circuit further includes a charging processor that receives input AC signal amplitude, input AC signal frequency, conditioned DC) waveform voltage, conditioned DC waveform current, and/ or a temperature of the synchronous rectifier from the rectifier controller and commands the actions of the rectifier controller to, for example, provide protection from detected fault conditions. The charging processor instructs the rectifier controller to turn the pair of normally open switches and the pair of normally closed switches on and off at approximated zero-crossings of the AC signal from the resonant network when the AC signal frequency is within an allowed range, an AC signal root mean square is above a threshold, and no faults have been detected. On the other hand, when a fault condition is detected, the charging processor may disable the rectifier controller, which holds the pair of normally open switches off and the pair of normally closed switches on. For example, the rectifier controller may hold the pair of normally open switches off and the pair of normally closed switches on when an over-voltage, over-current fault condition is detected by the second current and voltage sensor or an over-temperature fault condition is detected by the temperature sensor.

In further sample embodiments, the resonant network may comprise an alternating current (AC) current source and the synchronous rectifier may comprise a first pair of diodes respectively connected to first and second leads of the AC current source and a second pair of diodes respectively connected to the first and second leads of the AC current source. The shunting means may comprise a first normally closed switch may be connected in parallel with a first diode of the second pair of diodes and a second normally closed switch may be connected in parallel with a second diode of the second pair of diodes. The first and second normally closed switches shunt the AC current source in the event of a fault.

In still further sample embodiments, the resonant network may comprise an alternating current (AC) current source and the synchronous rectifier may comprise a first pair of diodes respectively connected to first and second leads of the AC current source and a second pair of diodes respectively connected to the first and second leads of the AC current source. The shunting means may comprise a normally closed safety switch that is connected between the first and second pairs of diodes. The normally closed safety switch shunts the AC current source in the event of a fault.

In yet further sample embodiments, the resonant network may comprise an alternating current (AC) current source and the synchronous rectifier may comprise a first pair of normally open switches respectively connected to first and second leads of the AC current source and a second pair of normally open switches respectively connected to the first and second leads of the AC current source. The shunting means may comprise a normally closed safety switch connected between the first and second pairs of normally open switches. The normally closed safety switch shunts the AC current source in the event of a fault.

The resonant network may be balanced or unbalanced in the sample embodiments. A variety of configurations may be used.

The resonant network may be a balanced parallel-parallel resonant network (PPRN) comprising an inductive primary coil, a first resonant capacitor in parallel with the primary coil, the secondary coil, and a second resonant capacitor in parallel with the secondary coil.

The resonant network may be an unbalanced series-series resonant network (SSRN) comprising an inductive primary coil, a first resonant capacitor in series with the primary coil, the secondary coil, and a second resonant capacitor in series with the secondary coil.

The resonant network may be an unbalanced parallel-series resonant network (PSRN) comprising an inductive primary coil, a first resonant capacitor in parallel with the primary coil, the secondary coil, and a second resonant capacitor in series with the secondary coil.

The resonant network may be an unbalanced series-parallel resonant network (SPRN) comprising an inductive primary coil, a first resonant capacitor in series with the primary coil, the secondary coil, and a second resonant capacitor in parallel with the secondary coil.

The resonant network may be a balanced PSRN comprising an inductive primary coil, a first resonant capacitor in parallel with the primary coil, the secondary coil, a second resonant capacitor in series with the secondary coil at a first end of the inductive coil and a third resonant capacitor in series with the secondary coil at a second end of the secondary coil.

The resonant network may be a balanced SPRN comprising an inductive primary coil, a first resonant capacitor in series with the primary coil at a first end of the primary coil, a second resonant capacitor in series with the primary coil at a second end of the primary coil, the secondary coil, and a third resonant capacitor in parallel with the secondary coil.

The resonant network may be a balanced SSRN comprising an inductive primary coil, a first resonant capacitor in series with the primary coil at a first end of the primary coil, a second resonant capacitor in series with the primary coil at a second end of the primary coil, the secondary coil, a third resonant capacitor in series with the secondary coil at a first end of the secondary coil, and a fourth resonant capacitor in series with the secondary coil at a second end of the secondary coil.

In sample embodiments, the resonant network may further comprise an inductive primary coil comprising a squared coil winding disposed on at least one side of an insulative substrate. A resonant capacitor may be connected in series to a first end of the squared coil winding and a second end of the squared coil winding may be connected to ground. As a result, the squared coil winding may have a common mode voltage relative to ground of one half a voltage across the resonant capacitor whereby the squared coil winding is a capacitive electromagnetic interference radiator.

In other sample embodiments, a first resonant capacitor may be connected in series to a first end of the squared coil winding and a second resonant capacitor may be connected in series to a second end of the squared coil winding. In such a configuration, a midpoint of the squared coil winding between the first and second ends of the squared coil winding is virtually ground whereby the squared coil winding does not capacitively radiate electromagnetic interference.

In further sample embodiments, techniques are provided to mitigate capacitive electromagnetic interference (EMI) that is radiated when the resonant network is unbalanced. In accordance with a first technique, the electric vehicle's tires are provided with conductive vias that ground the EMI during charging. In accordance with a second technique, the electric vehicle comprises a grounding cable that grounds the EMI during charging. In accordance with a third technique, the electric vehicle comprises a circuit powered by a battery of the electric vehicle that cancels out-of-phase voltages during charging.

In accordance with other aspects, a magnetic inductive resonance charging circuit is provided for charging a battery of an electric vehicle that includes a resonant network comprising an inductive secondary coil on the electric vehicle that converts a magnetic field received from an inductive primary coil into an alternating current (AC) signal, the resonant network being unbalanced so as to radiate capacitive electromagnetic interference (EMI), a synchronous rectifier that rectifies the AC signal to generate a direct current (DC) signal for application to the battery of the electric vehicle, and means for grounding the EMI during charging. In sample embodiments, the means for grounding the EMI during charging may comprise tires of the electric vehicle, where the tires have conductive vias that ground the EMI during charging. Alternatively, the means for grounding the EMI during charging may comprise a grounding cable connected to the electric vehicle so as to ground the EMI during charging. In another embodiment, the means for grounding the EMI during charging may comprise a circuit powered by a battery of the electric vehicle that cancels out-of-phase voltages during charging.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter. Rather, it will be understood that the following section provides summarized examples of some of the embodiments described in the Detailed Description below.

DETAILED DESCRIPTION OF THE DRAWINGS

The foregoing and other beneficial features and advantages of the invention will become apparent from the following detailed description in connection with the attached figures, of which:

FIG. 1 schematically illustrates a high-level circuit implementation of a safety enhanced magnetic resonant induction system.

Figure 2:
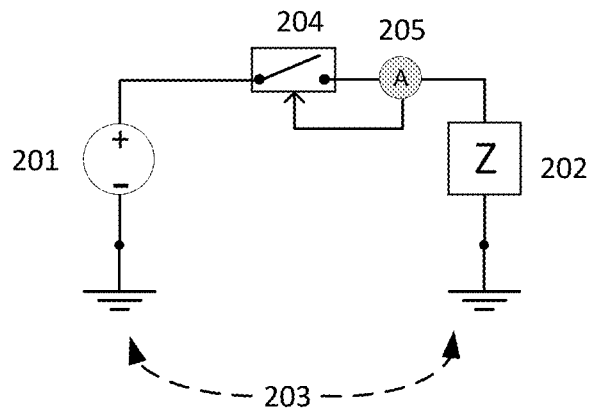

FIG. 2 schematically illustrates a generic safety circuit for a voltage source with a load.

Figure 3:
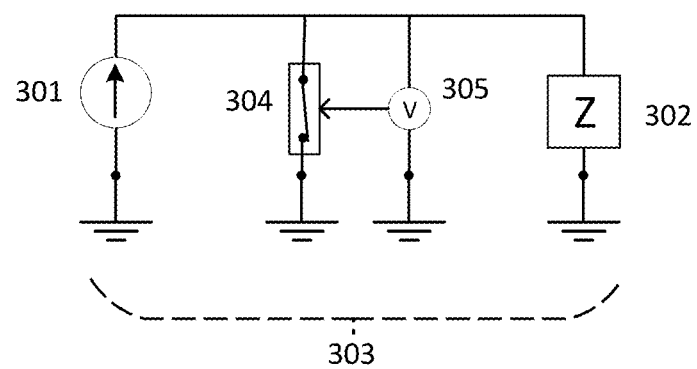

FIG. 3 schematically illustrates a generic safety circuit for a current source with a load.

Figure 4A:
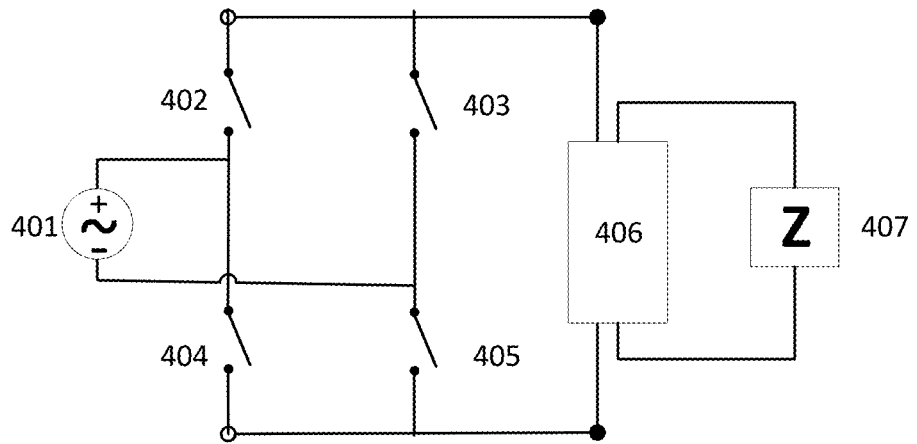

FIG. 4A schematically illustrates switch-based synchronous rectification of an alternating voltage source with a complex load impedance.

Figure 4B:
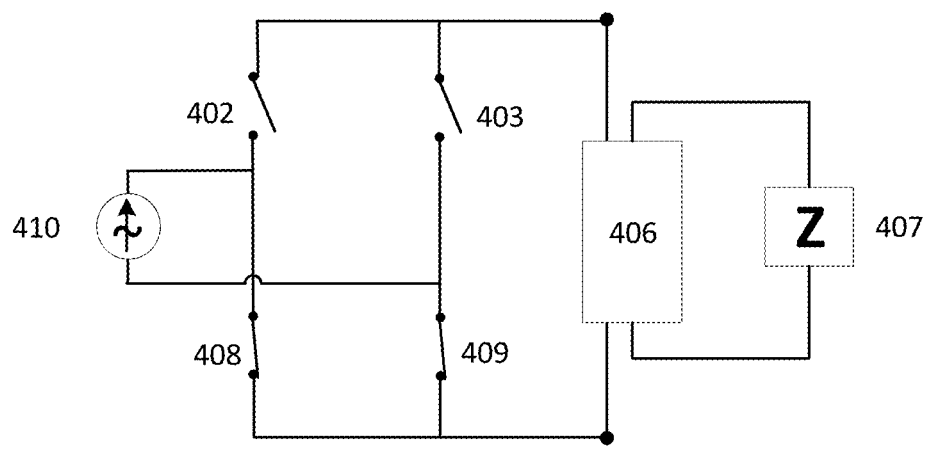

FIG. 4B schematically illustrates switch-based synchronous rectification of an alternating current source with a complex load impedance.

Figure 4C:
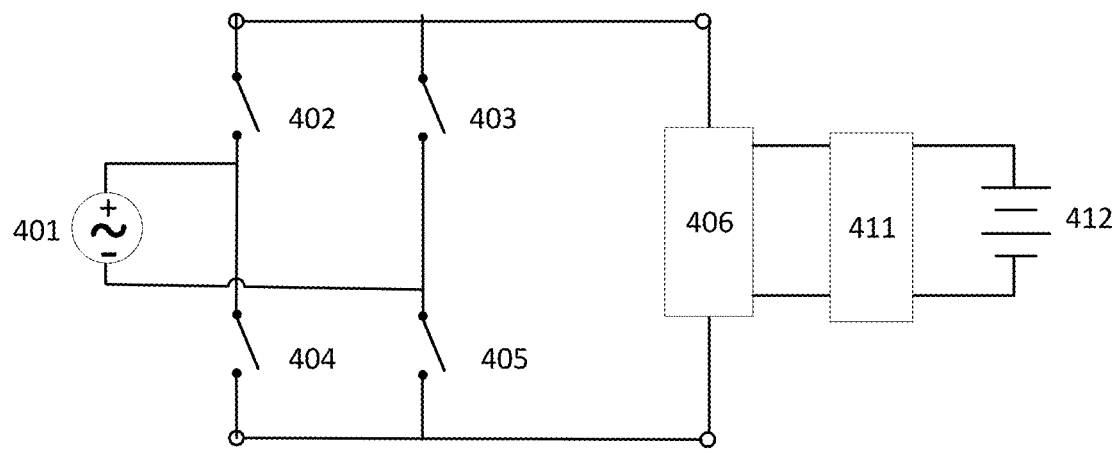

FIG. 4C schematically illustrates switch-based synchronous rectification of an alternating voltage source with a load.

Figure 4D:
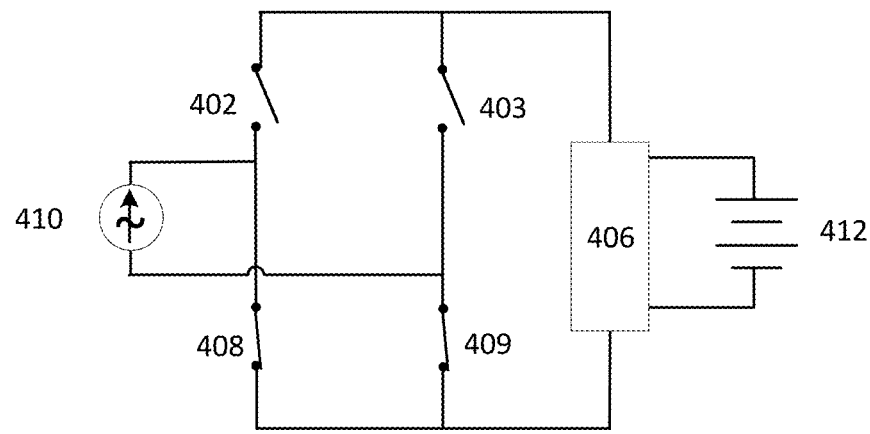

FIG. 4D schematically illustrates switch-based synchronous rectification of an alternating current source with a load.

Figure 5A:
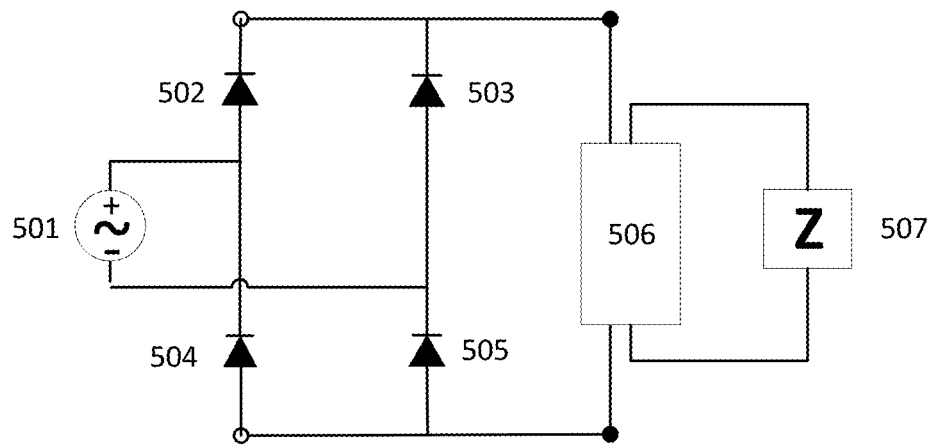

FIG. 5A schematically illustrates passive rectification of an alternating voltage source with a load.

Figure 5B:
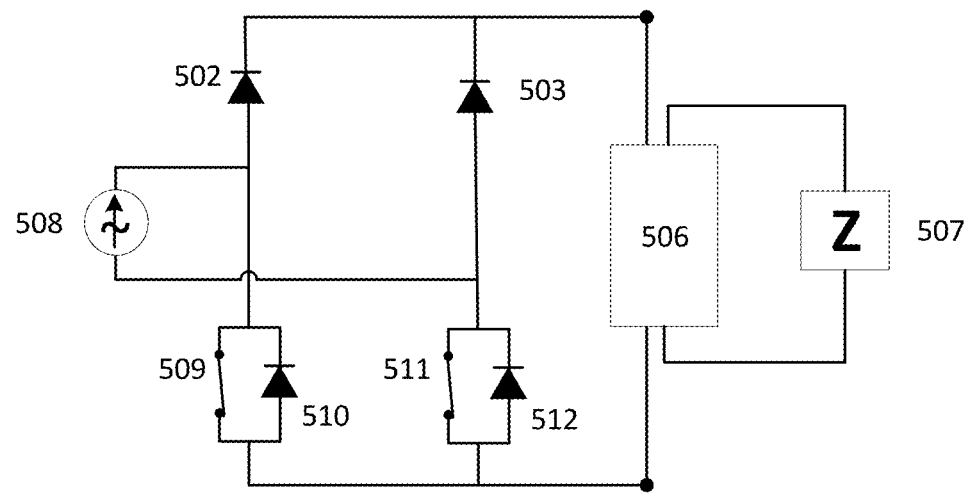

FIG. 5B schematically illustrates passive rectification of an alternating current source with a load.

Figure 5C:
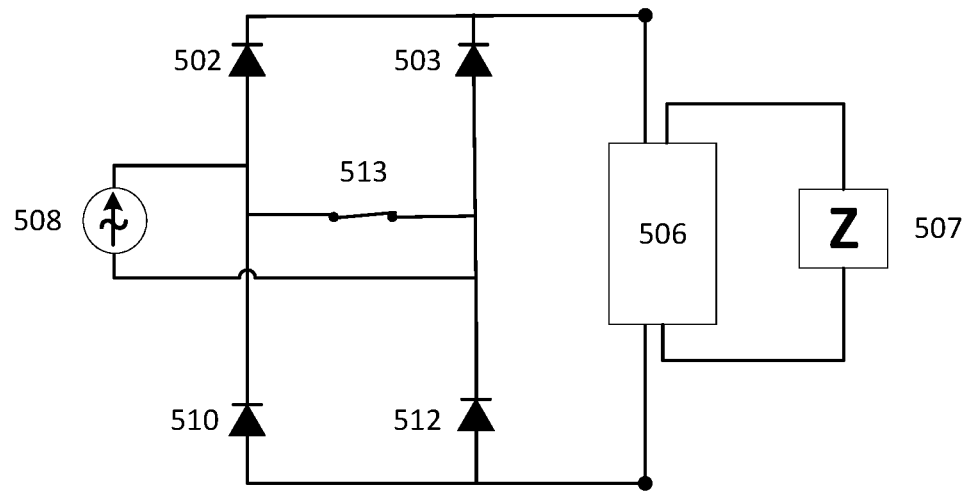

FIG. 5C schematically illustrates an alternate embodiment of passive rectification of an alternating current source with a load.

Figure 6:
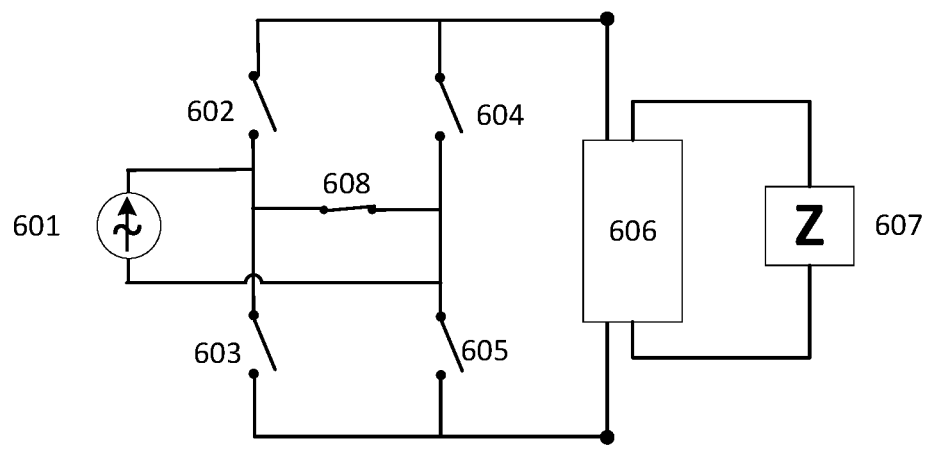

FIG. 6 schematically illustrates an alternate embodiment of switch-based synchronous rectification of an alternating current source with a load.

Figure 7A:
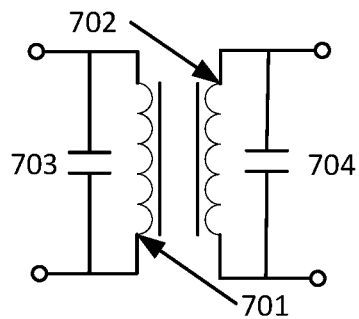

FIG. 7A schematically illustrates a parallel-parallel resonant induction circuit.

Figure 7B:
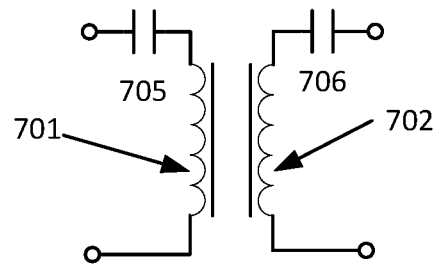

FIG. 7B schematically illustrates an unbalanced series-series resonant induction circuit.

Figure 7C:
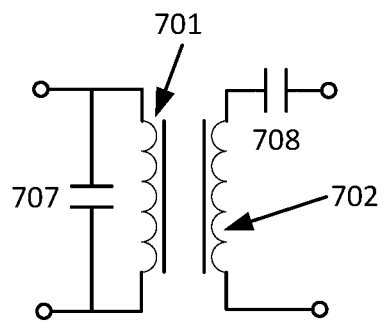

FIG. 7C schematically illustrates a hybrid parallel-unbalanced series resonant induction circuit.

Figure 7D:
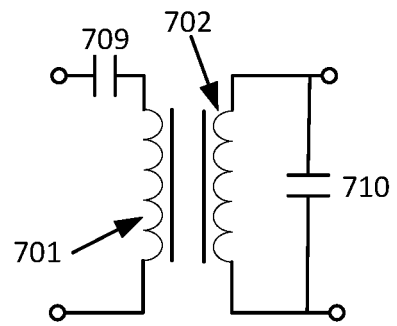

FIG. 7D schematically illustrates a hybrid unbalanced series-parallel resonant induction circuit.

Figure 7E:
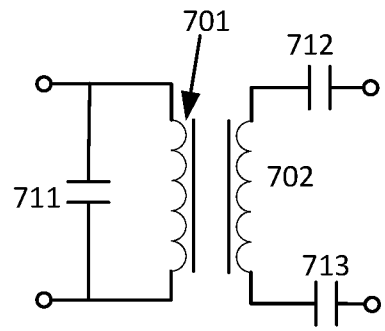

FIG. 7E schematically illustrates a hybrid parallel-balanced series resonant induction circuit.

Figure 7F:
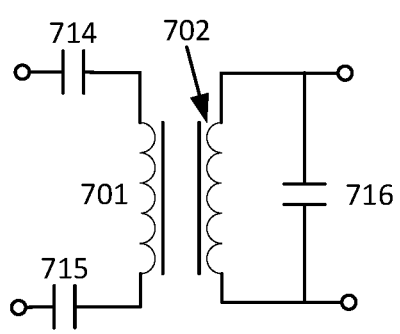

FIG. 7F schematically illustrates a hybrid balanced series-parallel resonant induction circuit.

Figure 7G:
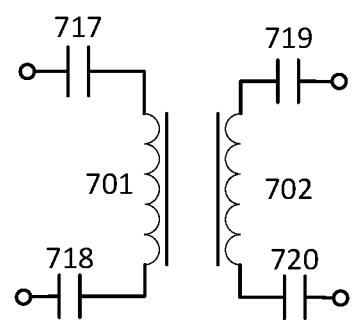

FIG. 7G schematically illustrates a balanced series-series resonant induction circuit.

Figure 8:
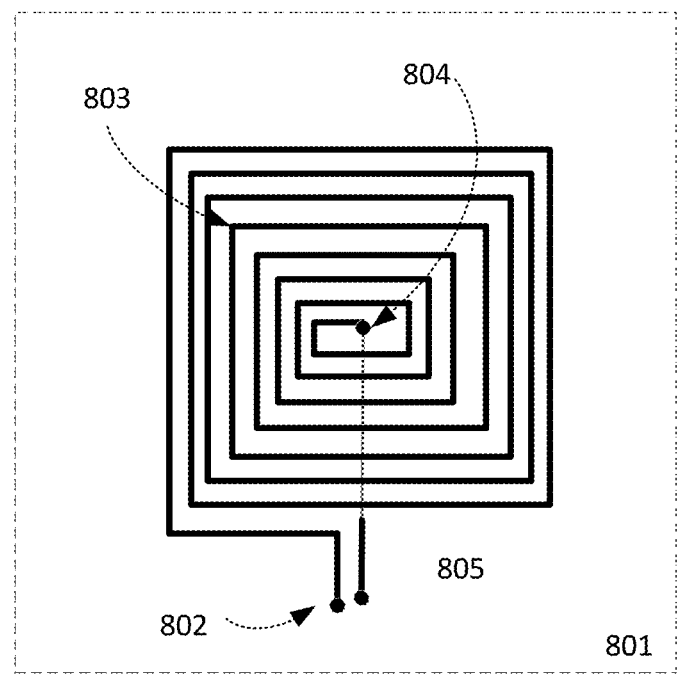

FIG. 8 geometrically illustrates a coil for use in a magnetic resonance inductive power system.

Figure 9:
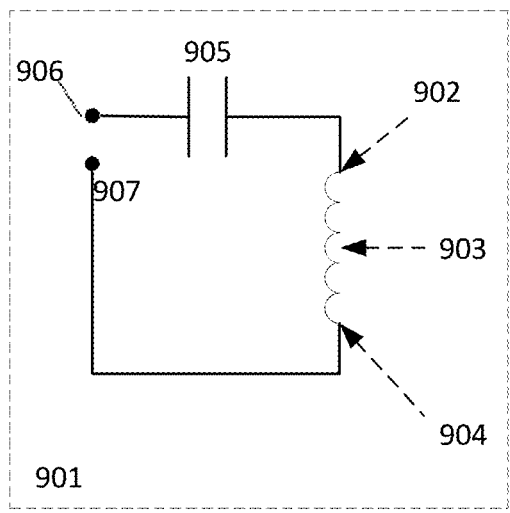

FIG. 9 schematically illustrates an unbalanced circuit equivalent of a planar coil for use in a resonance inductive power system.

Figure 10:
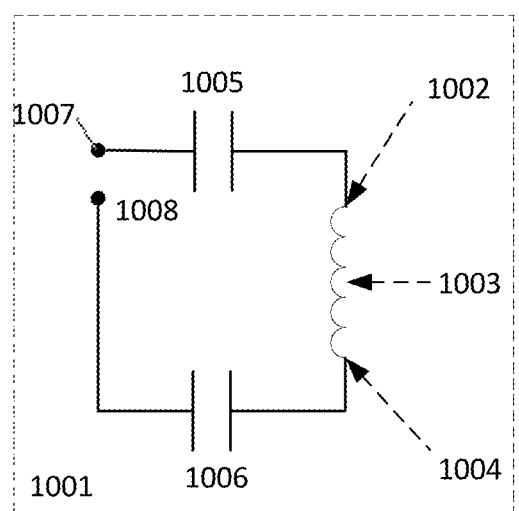

FIG. 10 schematically illustrates a balanced circuit equivalent of a planar coil for use in a resonance inductive power system.

Figure 11:
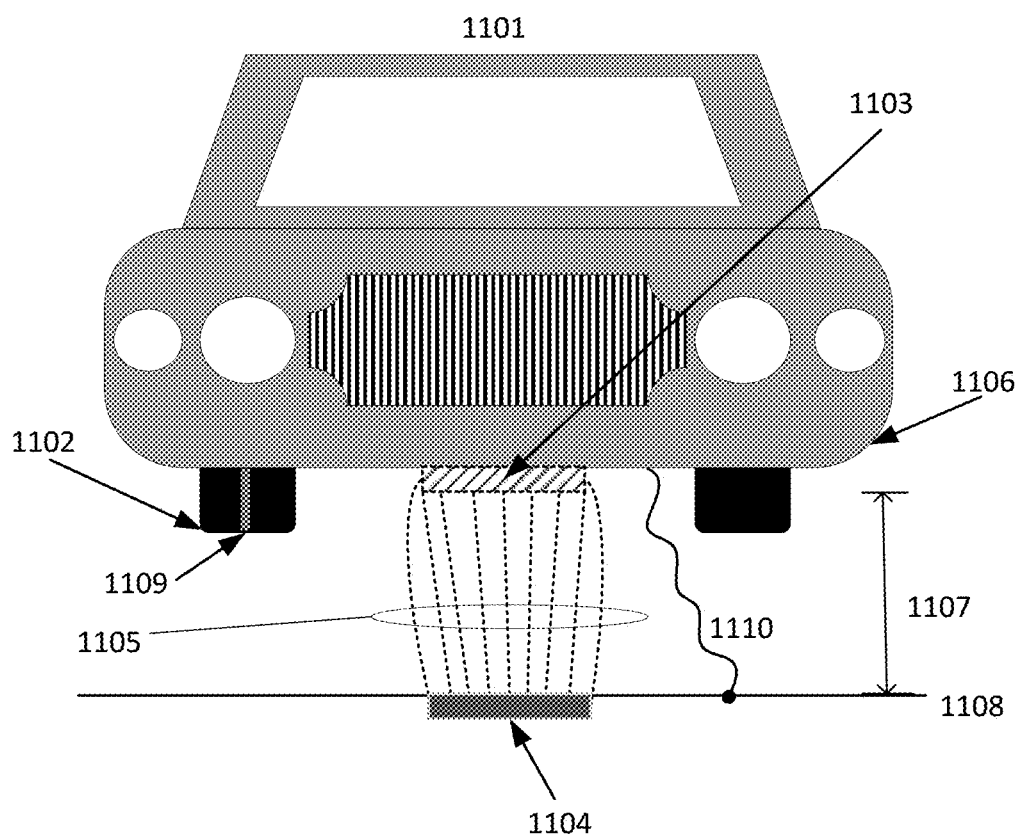

FIG. 11 illustrates the parasitic electric fields for a resonance inductive power system of an electric vehicle with an unbalanced resonant network.

DETAILED DESCRIPTION OF ILLUSTRATIVE EMBODIMENTS

Exemplary embodiments of the invention will be described with respect to the Figures. The current source safety circuit and associated method described herein may be understood more readily by reference to the following detailed description taken in connection with the accompanying figures and examples, which form a part of this disclosure. It is to be understood that this description is not limited to the specific products, methods, conditions or parameters described and/or shown herein, and that the terminology used herein is for the purpose of describing particular embodiments by way of example only and is not intended to be limiting of any claimed subject matter. Similarly, any description as to a possible mechanism or mode of action or reason for improvement is meant to be illustrative only, and the subject matter described herein is not to be constrained by the correctness or incorrectness of any such suggested mechanism or mode of action or reason for improvement. Throughout this text, it is recognized that the descriptions refer both to methods and systems/software for implementing such methods.

A detailed description of illustrative embodiments will now be described with reference to FIGS. 1-11. Although this description provides a detailed example of possible implementations, it should be noted that these details are intended to be exemplary and in no way delimit the scope of the inventive subject matter.

In a wireless power transfer system using an open air-transformer, the resonant network (i.e., the primary/transmitter and secondary/receiver) used for magnetic/wireless charging produces an alternating current source for rectification on the vehicle. Having a current source reverses most of the conventions that are typical of voltage sources in household and industrial use scenarios for power supply. The key difference from these scenarios is that in a voltage source short circuits are bad. As a result, power conversion topologies are built with normally off devices to avoid a short. However, with current sources the reverse is true: open circuits are bad. This means that the typical rectification technologies are undesirable. A straight passive (e.g. diode-based) rectifier gives no protection. A conventional synchronous rectifier can provide protection but only as long as there is a reliable means of energizing the devices to turn them on.

FIG. 1 schematically illustrates a high-level schematic for a direct current battery charging circuit using magnetic induction resonance. The resonant network 101 (aka the receiver or secondary) consists of an inductive secondary coil 104 with balanced capacitances 105 and 106. The secondary coil 104 converts the magnetic field from the charging transmitter (not shown) into an alternating current (AC) signal that series resonates with the balanced capacitances 105 and 106 in the voltage domain. As will be explained below with respect to FIGS. 7A-7G, the primary side of the resonant network may be balanced or unbalanced. The AC signal from the resonant network 101 is then rectified into a direct current (DC) signal at rectification stage 102. The rectification stage 102 consists of a synchronous rectification circuit using paired normally open (NO) switches 107 and 108 and paired normally closed (NC) switches 109 and 110. As will be explained below, the paired NC switches 109 and 110 function to shunt the resonant network 101 in the event of a fault. The DC signal is passed to the conditioning circuitry 111. The output of the conditioning circuitry 111 is a conditioned DC signal used to charge the battery 112.

The rectifier controller 115 phase locks to the resonant network current at the first current and voltage sensor 113 as a reference for controlling the timing of the rectifier switches 107-110 (e.g., with respect to detected zero crossings). The rectifier controller 115 (nominally a Field Programmable Gate Array (FPGA) or conventional microcontroller) produces estimates of the amplitude, frequency and instantaneous phase of the input AC waveform from the secondary coil 104 via the first current and voltage sensor 113 whenever the AC waveform is of sufficient amplitude and the switching frequency is within its acquisition range. The rectifier controller 115 also monitors amplitude of the output DC current waveform applied to the battery 112 via the second current and voltage sensor 114.

The vehicle charging processor 116 (nominally implemented as software running on a microprocessor) handles communications with internal (to the wireless power transfer (WPT) system) subsystems and external vehicle systems via interfaces (e.g. a controller area network (CAN) bus) and can command the actions of the rectifier controller 115. For example, when queried by the vehicle charging processor 116, the rectifier controller 115 may report the input AC signal amplitude, input AC signal frequency, DC output voltage and current and the switching devices' temperature. If the reported input switching frequency is within the allowed closed range (e.g., 79 kHz to 90 kHz), the AC root mean square (RMS) is above a threshold (e.g., 5 Amps), and there are no detected faults, then the vehicle charging processor 116 may instruct the rectifier controller 115 to turn the upper pair of NO switches 107 and 108 and the lower pair of NC switches 109 and 110 on-and-off at the appropriate zero-crossings of the input AC waveform to maximize the efficiency of rectification. The nominal state is "startup" or "safe" where the upper pair of NO switches 107 and 108 are open and the lower pair of NC switches 109 and 110 are closed. When the secondary coil 104 is producing a positive signal, the first set of switches 107 and 108 are opened and the second set of switches 109 and 110 are closed. When the signal from the secondary coil 104 inverts, the first set of switches 107 and 108 are closed and the second set of switches 109 and 110 are opened. This sequence repeats, resulting in an output signal which is mathematically the absolute value of the input AC signal.

If disabled by the vehicle charging processor 116, the rectifier controller 115 holds the upper NO switch pair 107 and 108 off and the lower NC switch pair 109 and 110 on. Also, if an over-voltage, over-current fault condition is detected at the current and voltage sensor 114 or an over-temperature fault condition is detected at temperature sensor 117, the rectifier controller 115 holds the upper NO switch pair 107 and 108 Off and lower switches NC pair 109 and 110 On to shunt the current from the resonant network 101.

The rectifier controller 115 monitors the output DC voltage from the rectification stage 102 via current and voltage sensor 114. The rectifier controller 115 also measures output DC current via current and voltage sensor 114 and reports the output DC current to the vehicle charging processor 116 so that the system may compute the total power delivered to the battery 112. In addition, the rectifier controller 115 may monitor the temperature sensor or sensors (e.g. a thermistor or network of thermistors) 117 that measures the temperature of the mounting plate of the rectifier's switching devices 107-110. This mounting-plate temperature represents the case temperature of the switching devices 107-110, which is related to the power losses through the switching devices 107-110.

When paired with a series-series resonant transmitter (not shown), the resonant network 101 is an AC current source. Any condition that open circuits the resonant network 101 results in an unsafe condition. However, the selection of NO switches 107 and 108 and NC switches 109 and 110 for the synchronous rectification stage 102 results in an inherently safe system. In the normal condition, either incidentally or specifically controlled, the NC switches 109 and 110 may be closed to shunt the secondary coil 104, thus providing means for shunting the AC current source of the resonant network 101. The NO switches 107 and 108 prevent shorting the output network 103, particularly the battery 112.

In the event of a fault, the battery 112 is disconnected from the signal conditioning circuitry 111, and the current flow out of the conditioning circuitry 111 is reduced to zero while the current flow into the conditioning circuitry 111 does not change. This will cause the voltage across the conditioning circuitry 111 and rectification stage 102 to increase at a rate proportional to the rectified current and impedance of the conditioning circuitry 111.

The rectifier controller 115 monitors the voltage and/or current using current and voltage sensor 114 to detect the disconnection of the battery 112. In the event of a fault, the rectifier controller 115 may respond by opening NO switches 107 and 108 and closing NC switches 109 and 110. This acts to disconnect the resonant network 101 from the conditioning circuitry 111 and battery 112. Power transfer will stop immediately as the rectified current flow out of the rectification stage 102 to the conditioning circuitry 111 and battery 112 will be interrupted by NO switches 107 and 108 and current flow out of the resonant network 101 will be shunted through NC switches 109 and 110.

In the passive state, where there is no control power to operate a controller or to synchronously rectify, the NO switches 107 and 108 open the output network 103 while the NC switches 109 and 110 shunt the resonant network 101. This protects the charger, load and service personnel from spurious energy picked up by the resonant network 101, whether the spurious energy is accidental or malicious.

FIG. 2 schematically illustrates a generic safety circuit for a voltage source with a load. In FIG. 2, a generic voltage source supply protection solution is shown where the voltage source 201 and load 202 share a common ground 203. The voltage source 201 provides a fixed voltage invariant of the sourced current. The source current is set by the load impedance of load 202. Current sensor 205 monitors the source current. If the source current exceeds an allowable limit, the current sensor 205 provides a protection function by triggering the normally open switch 204 to its open state. The normally open switch 204 remains open until reset. Once the disconnect of normally open switch 204 is triggered, the voltage across and current flow thru the load 202 are driven to zero. The Normally Open (NO) switch 204 and current sensor 205 shown here is merely one implementation option with various relays, circuit breakers, and fuses in wide use. Virtually all power supply and distribution networks operate with a voltage source and implement some sort of current limiting scheme using some form of breaker or fuse as illustrated in FIG. 2. It will be appreciated that in a voltage source power system, open circuits are good and short circuits are bad.

The current source supply depicted in FIG. 3 is a much less common implementation. A constant current supply requires a mirror of all the best practices in safety protection of the more common voltage source supply. It will be appreciated that in a current source power system, unlike a voltage source power system, open circuits are bad and shunts (intentional short circuits) are good practice. Hence, different embodiments of the safety circuit described herein should be considered based on whether the power supply is a current source power system or a voltage source power system.

FIG. 3 schematically illustrates a generic safety circuit for a current source with a load. The current source 301 supplies the electric current to the load 302 independent of the voltage across it. In this example, all circuit paths share a common ground 303. The current source 301 provides a fixed current invariant of the voltage current.

To provide a current shunt and isolation of the load from the source (and vice-versa), a voltage-sensitive disconnect is placed in parallel with the load 302. The Normally Closed (NC) switch shunt 304 and voltage sensor 305 shown in FIG. 3 is merely one implementation option of shunting means with various switches, relays, circuit breakers, and fuses in wide use. Once the NC switch shunt 304 is triggered by the voltage sensor 305, the NC switch shunt 304 is closed to drive the voltage and current flow through the load 302 to zero.

FIGS. 4A-4D all illustrate alternative embodiments of the safety rectification circuit and additional subsystems needed for wireless power transfer.

FIG. 4A schematically illustrates switch-based synchronous rectification of an alternating voltage source with a complex load impedance. In particular, FIG. 4A illustrates a conventional alternating current (AC) voltage source and a safety-enhanced synchronous rectification circuit to create a direct current (DC) voltage source. The AC voltage source 401 is synchronously rectified by the set of normally open (NO) switches 402, 403, 404, and 405. The power conditioning network 406 provides filtering of the rectified DC voltage into a DC voltage source for the load 407. In the event of a fault, the NO switches fail open, disconnecting and protecting the load 407 from AC voltage source 401.

FIG. 4B schematically illustrates switch-based synchronous rectification of an alternating current source with a complex load impedance in a sample embodiment. In particular, FIG. 4B illustrates an AC current source and a safety-enhanced synchronous rectification circuit to create a DC current source. The AC current source 410 is synchronously rectified by the set of NO switches 402 and 403 and normally closed (NC) switches 408 and 409. The power conditioning network 406 provides filtering of the rectified current into a DC current source for the load 407. The AC current source 410 necessitates the set of NC switches 408 and 409 to close to provide means for shunting current in the event of a fault. In the faulted condition, the open switches 402 and 403 isolate the load 407 from the AC current source 410 to prevent any back feed of power.

FIG. 4C schematically illustrates switch-based synchronous rectification of an alternating voltage source with a load. In particular, FIG. 4C illustrates an AC voltage source and a safety-enhanced synchronous rectification circuit to create a DC voltage source for charging a battery. The AC voltage source 401 is synchronously rectified by the set of NO switches 402, 403, 404, and 405. The power conditioning network 406 provides filtering of the rectified voltage into a DC voltage source for the power conversion stage 411. The power conversion stage 411 adapts the DC voltage source to the required voltage for charging the battery 412.

FIG. 4D schematically illustrates switch-based synchronous rectification of an alternating current source with a load in a sample embodiment. In particular, FIG. 4D illustrates an AC current source and a safety-enhanced synchronous rectification circuit to create a DC voltage source for charging a battery. The AC current source 410 is synchronously rectified by the set of NO switches 402 and 403 and NC switches 408 and 409. The power conditioning network 406 provides filtering of the rectified current into a DC current source for the battery 412. The AC current source 410 necessitates the set of NC switches 408 and 409 to provide means for shunting current in the event of a fault. However, as the system is powered by a current source, the power conversion stage 411 of FIG. 4C is not needed for battery charging.

FIG. 5A schematically illustrates passive rectification of an alternating voltage source with a load. In particular, FIG. 5A shows schematically a conventional passive full-wave rectifier circuit for an AC voltage source 501. The diodes 502, 503, 504, and 505 act as one-way gates, creating a full-wave rectification of the AC signal. The power conditioning stage 506 serves to smooth the rectifier voltage output applied to the load 507, allowing the load 507 to be charged.

Like all diode circuits, reverse recovery time and voltage drop in the forward bias condition impact the efficiency of the rectification circuit. The passive rectifier circuit does not need a controller stage. However, in the event of a fault, the AC voltage source 501 is still connected to the load 507 via the power conditioning stage 506 exposing the load 507 to voltage source faults (and vice-versa).

FIG. 5B schematically illustrates passive rectification of an alternating current source with a load in a sample embodiment. In particular, FIG. 5B shows a hybrid embodiment of a safety-enhanced circuit for rectification of an AC current source 508. The full-bridge passive rectifier diodes 502, 503, 510, and 512 are supplemented by the normally closed (NC) switches 509 and 511. The diodes 502, 503, 510, and 512 act as one-way gates, creating a full-wave rectification. The NC switches 509 and 511 act as means for shunting in the case of a failure, preventing overvoltage damage to the AC current source 508 and across the diodes 502, 503, 510, and 512. The power conditioning stage 506 serves to smooth the rectifier voltage output applied to the load 507, allowing the load 507 to be charged.

Like all diode-based rectification circuits, reverse recovery time and voltage drop in the forward bias condition impact the efficiency of the rectification circuit. The passive rectifier circuit does not need a controller stage, but a controller (e.g., rectifier controller 115) is needed to command the NC switches 509 and 511.

FIG. 5C schematically illustrates an alternate passive rectification of an alternating current source with a load in a sample embodiment. In particular, FIG. 5C shows an alternative, semi-passive embodiment of a full-wave safety-enhanced rectifier circuit for an AC current source 508. The diodes 502, 503, 510, and 512 act as one-way gates, creating a full-wave rectification. The power conditioning stage 506 serves to smooth the rectifier voltage output applied to the load 507, allowing the load 507 to be charged. In this embodiment, a normally closed (NC) shunt switch 513 is placed in the circuit. In the event of a fault or command option, the shunt switch 513 shunts the current in the rectifier circuit, preventing damage to the power conditioning stage 506 and the load 507.

This embodiment is a cheaper implementation with simpler controls. However, it is less efficient. Additionally, it places a high dV/dt across the isolated control boundary for shunt switch 513. Like all diode-based rectification circuits, reverse recovery time and voltage drop in the forward bias condition impact the efficiency of the rectification circuit.

FIG. 6 schematically illustrates an alternate switch-based synchronous rectification of an alternating current source with a load in a sample embodiment. In particular, FIG. 6 illustrates an alternative safety circuit for active rectification of an AC current source 601. The power conditioning stage 606 serves to smooth the rectifier voltage output applied to the load 607 to be charged. The full-wave rectification is accomplished by alternately switching at zero crossing of the sinusoidal output of the AC current source 601. A normally closed (NC) safety switch 608 is installed between the Normally Open (NO) upper rectification switches 602 and 604 and lower Normally Open (NO) rectification switches 603 and 605 that provides, in the event of a fault or commanded option, a means for shunting the current in the rectifier circuit, preventing damage to the power conditioning stage 606 and the load 607.

In a fault condition or loss of rectification control, the NO rectification switches 602, 603, 604, and 605 fail (or are commanded) to the Open state while the NC safety switch 608 fails to the Closed state. Current is thus shunted back to the AC current source 601 by the NC safety switch 608 while the load is isolated by the switches 602-605. This embodiment reduces the demand for normally closed (NC) switches at the expense of an additional switch 608.

For resonant induction wireless charging, there are four potential two pole networks. There is the parallel-parallel resonant network (PPRN) and series-series resonant network (SSRN). Due to the galvanic isolation, it is also possible to create a parallel-series resonant network (PSRN) and a series-parallel resonant network (SPRN). The PPRN, PSRN and SPRN all behave as AC Voltage Controlled Voltage Sources (VCVS) when the load impedance is large compared to the network impedance and all behave as AC Voltage Controlled Current Sources (VCCS) when the load impedance is small compared to the network impedance. On the other hand, the SSRN behaves as a VCCS for all load impedances. A constant voltage load, e.g. a battery, appears as a variable load impedance as the power level is varied. At low powers, a battery will appear as a high impedance load and at high powers it will appear as low impedance. At high power, all four resonant networks will behave as a VCCS.

When operating as a VCCS, the PPRN has a Transconductance (G) of $k/(w*L)$ in units of Amperes per Volt, where k is the magnetic coupling coefficient of the primary and secondary inductors in the range of zero to one and is unitless, w is the resonant frequency of the network in radians per second, and L is the geometric mean of the primary and secondary inductors in Henrys. When operating as a VCCS, the PSRN, SPRN and SSRN have a G of $1/(w*L*k)$. This means for a fixed G then the inductor of the PPRN has an inductor smaller by $k^2$ and the capacitor of the PPRN is larger by $k^{-2}$. This is undesirable as the capacitor is the much more expensive component.

The resonant network resonates an amount of power S that is proportional to P/k where P is the power through the network. For typical values of k (e.g., 0.05-0.2), S will be 5 to twenty times higher than P. In parallel resonant branches, the resonant power is seen as current through the capacitive and inductive elements. In series resonant branches, the resonant power is seen as additional voltage across the capacitive and inductive elements. For example, in a 500V and 125 A system with a k of 0.1, in a parallel resonance there would be 125 A/0.1 or 1,250 A resonating in the inductor and capacitor, while in a series resonance there would be 500V/0.1 or 5,000V resonating across the inductor and capacitor. The series resonance case is preferred as higher voltages require additional isolation while higher currents require additional conductors and so higher voltages allow for a lighter and more compact product.

With these considerations in mind, each of the PSRN, SPRN and SSRN may have both a balanced and unbalanced topology. The PPRN only has a balanced topology. Each of these topologies is illustrated in FIGS. 7A-7G.

FIG. 7A schematically illustrates a balanced PPRN circuit in a sample embodiment. This resonant network comprises a ground inductive coil 701, a ground parallel resonant capacitor 703, a vehicle inductive coil 702, and a vehicle parallel resonant capacitor 704.

FIG. 7B schematically illustrates an unbalanced SSRN circuit in a sample embodiment. This resonant network comprises a ground inductive coil 701, a ground series resonant capacitor 705, a vehicle inductive coil 702, and a vehicle series resonant capacitor 706.

FIG. 7C schematically illustrates an unbalanced PSRN circuit in a sample embodiment. This resonant network comprises a ground inductive coil 701, a ground parallel resonant capacitor 707, a vehicle inductive coil 702, and a vehicle series resonant capacitor 708.

FIG. 7D schematically illustrates an unbalanced SPRN circuit in a sample embodiment. This resonant network comprises a ground inductive coil 701, a ground series resonant capacitor 709, a vehicle inductive coil 702, and a vehicle parallel resonant capacitor 710.

FIG. 7E schematically illustrates a balanced PSRN circuit in a sample embodiment. This resonant network comprises a ground inductive coil 701, a ground parallel resonant capacitor 711, a vehicle inductive coil 702, and a pair of vehicle series resonant capacitors 712 and 713.

FIG. 7F schematically illustrates a balanced SPRN circuit in a sample embodiment. This resonant network comprises a ground inductive coil 701, a pair of ground series resonant capacitors 714 and 715, a vehicle inductive coil 702, and a vehicle parallel resonant capacitor 716.

FIG. 7G schematically illustrates a balanced SSRN circuit in a sample embodiment. This resonant network comprises a ground inductive coil 701, a pair of ground series resonant capacitors 717 and 718, a vehicle inductive coil 702, and a pair of vehicle series resonant capacitors 719 and 720.

FIG. 8 geometrically illustrates a planar coil 801 for use as a primary coil in a magnetic resonance inductive power system in a sample embodiment. While shown as a squared coil, other geometries (e.g. classic round coil or rectangular) are also possible. The coil winding 803 is disposed on an insulative substrate 805 and may include discrete conductive ribbons (e.g., a printed circuit board), insulated wire strands (e.g., Litz wire), or the like. Vias 802 and 804 permit connectivity with another coil on the opposite side of the insulative substrate 805.

FIG. 9 schematically illustrates an unbalanced circuit equivalent of planar coil 801 for use in a series resonant network 901 in a sample embodiment. The series resonant network 901 is a transmitter. The terminals 906 and 907 of the network are connected to an inverter. The resonant capacitor 905 has a high voltage high frequency voltage across it as the series resonant network 901 is resonated. This same voltage is seen across the inductor 903. The first terminal 904 of the inductor 903 is effectively held at ground potential. The second terminal 902 of the inductor is exposed to the full voltage of the resonant capacitor 905 relative to ground. In other words, the voltage of the inductor 903 has a common mode voltage relative to ground of one half the voltage across the resonant capacitor 905, which makes the inductor 903 a capacitive electromagnetic interference (EMI) radiator. In this configuration, techniques are desired for mitigating the EMI radiation, as noted below with respect to FIG. 11.

FIG. 10 schematically illustrates a balanced circuit equivalent of planar coil 801 for use in a series resonant network 1001 in a sample embodiment. The series resonant network 1001 is also a transmitter. The terminals 1007 and 1008 of the network are connected to an inverter. The capacitors 1005 and 1006 have a high voltage high frequency voltage across them as the series resonant network 1001 is resonated. The sum of their voltages is seen across the inductor 1003. However, as the series resonant network 1001 is balanced, the midpoint of the inductor 1003 between terminals 1002 and 1004 is virtually ground. So, while there is a differential voltage across the inductor 1003, there is no high frequency common mode voltage to ground. The inductor 1003 does not capacitively radiate EMI, and no mechanism is required for handling the EMI.

FIG. 11 illustrates the parasitic electric fields for a resonance inductive power system of an electric vehicle 1101 with an unbalanced resonant network leading to EMI radiation in a sample embodiment. Electric vehicles 1101 have marginal conductance between the chassis 1106 and ground 1108 through the tires 1102. The admittance, at high frequencies, between the chassis 1106 and ground 1108 is dominated by the capacitance between the chassis 1106 and ground 1108. Common mode capacitive EMI generated by the transmitter 1104 or the receiver 1103 must be minimized as the electric field 1105 developed in the gap 1107 between the chassis 1106 and ground 1108 will energize the capacitance and introduce a voltage on the chassis 1106. At a minimum, this capacitive coupling can extend an EMI problem and at worst it can present a shock hazard.

The chassis voltage may be reduced by the addition of conductive path(s) to ground that function as means for grounding the EMI while charging is underway. The already conductive materials (carbon black) of tires may be enhanced with the addition of lower resistance conductive vias 1109 through the tire material. Deployment of a grounding cable or wire 'tail' 1110 could also be used to mitigate chassis voltages during charging. Chassis voltage also may be mitigated by the addition of a circuit powered by the wireless charging system or vehicle battery system that cancels out-of-phase voltages during charging.

It will be appreciated by those skilled in the art that the embodiments described herein provide various means for shunting the direct current waveform in the event of a fault so as to minimize the possibility of electric shock while charging. The techniques may be used for balanced or unbalanced resonant network topologies. The rectification circuitry may include diodes and/or switches in configurations designed to shunt the power in the event of a fault, which leads to increased safety during the charging process, particularly for high power transfer applications such as the charging of electric vehicles.

As discussed herein, the logic, commands, or instructions that implement aspects of the methods described herein may be provided in a computing system including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described herein, or other aspects depicted in the accompanying drawings and detailed description below. Such systems and computer-readable media including instructions for implementing the methods described herein also constitute sample embodiments.

The monitoring and control functions described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass a tangible hardware and/or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Those skilled in the art will appreciate that the topology and circuit implementation methodology described herein enables effective realization as a single application specific integrated circuit. Further, while the disclosure contained herein pertains to the provision of electrical power to vehicles, it should be understood that this is only one of many possible applications, and other embodiments including non-vehicular applications are possible. For example, those skilled in the art will appreciate that there are numerous applications of providing a current source safety circuit in non-vehicle inductive charging applications such as portable consumer electronic device chargers, such as those (e.g., PowerMat™) used to charge toothbrushes, cellular telephones, and other devices. Accordingly, these and other such applications are included within the scope of the following claims.

What is claimed is:

1. A magnetic inductive resonance charging circuit, comprising:
   a resonant network comprising an inductive secondary coil that converts a magnetic field received from an inductive primary coil into an alternating current (AC) signal and first and second balanced capacitors connected in series to respective ends of the secondary coil whereby the AC signal series resonates with the first and second capacitors;
   a synchronous rectifier that rectifies the AC signal to generate a direct current (DC) signal for application to a load to be charged, the synchronous rectifier comprising a pair of normally open switches and a pair of normally closed switches, one of the pair of normally open switches and one of the pair of normally closed switches being connected to the first balanced capacitor and another of the pair of normally open switches and another of the pair of normally closed switches being connected to the second balanced capacitor, wherein the normally closed switches are arranged to shunt the secondary coil in the event of a fault or loss of rectification control;
   a rectifier controller that monitors at least one of voltage or current in the resonant network to detect the fault or loss of rectification control and that disconnects the resonant network from the load to be charged upon detection of the fault or loss of rectification control; and
   a charging processor that, when a fault or loss of rectification control condition is detected by the rectifier controller, disables the rectifier controller, which holds the pair of normally open switches off and the pair of normally closed switches on,
   wherein the normally closed switches shunt current flow out of the resonant network when the fault or loss of rectification control is detected during active rectification, and
   wherein the normally open switches disconnect the resonant network from the load when no power is applied to the synchronous rectifier.

2. A charging circuit as in claim 1, wherein the resonant network is an AC current source.

3. A charging circuit as in claim 1, wherein the normally open switches are configured to prevent shorting of the load in the event of a fault or loss of rectification control.

4. A charging circuit as in claim 1, further comprising signal conditioning circuitry that conditions the DC signal into a conditioned DC signal for application to the load.

5. A charging circuit as in claim 4, further comprising a first current and voltage sensor that monitors the AC signal input into the synchronous rectifier from the resonant circuit and a second current and voltage sensor that monitors the conditioned DC signal applied to the load.

6. A charging circuit as in claim 5, wherein the rectifier controller is responsive to values measured by the first current and voltage sensor and the second current and voltage sensor to phase lock to the AC signal output by the resonant network and to provide control signals that control the switching of the pair of normally open switches and the pair of normally closed switches in response to the measured values.

7. A charging circuit as in claim 6, further comprising a temperature sensor that detects an over-temperature fault condition of the synchronous rectifier and provides a detection signal to the rectifier controller.

8. A charging circuit as in claim 7, wherein the charging processor receives at least one of input AC signal amplitude, input AC signal frequency, conditioned DC waveform voltage, conditioned DC waveform current, and a temperature of the synchronous rectifier from the rectifier controller and commands actions of the rectifier controller.

9. A charging circuit as in claim 8, wherein the charging processor instructs the rectifier controller to turn the pair of normally open switches and the pair of normally closed switches on and off at approximated zero-crossings of the AC signal from the resonant network when the AC signal frequency is within an allowed range, an AC signal root mean square is above a threshold, and no faults have been detected.

10. A charging circuit as in claim 8, wherein the rectifier controller holds the pair of normally open switches off and the pair of normally closed switches on when an over-voltage, over-current fault condition is detected by the second current and voltage sensor or an over-temperature fault condition is detected by the temperature sensor.

11. A charging circuit as in claim 1, wherein the resonant network comprises the inductive primary coil, a first resonant capacitor in series with the primary coil at a first end of the primary coil, and a second resonant capacitor in series with the primary coil at a second end of the primary coil.

12. A charging circuit as in claim 1, wherein the resonant network further comprises the inductive primary coil comprising a squared coil winding disposed on at least one side of an insulative substrate.

13. A charging circuit as in claim 12, further comprising a first resonant capacitor connected in series to a first end of the squared coil winding and a second resonant capacitor connected in series to a second end of the squared coil winding, a midpoint of the squared coil winding between the first and second ends of the squared coil winding being virtually ground whereby the squared coil winding does not capacitively radiate electromagnetic interference.

14. A charging circuit as in claim 1, wherein the secondary coil is mounted on an electric vehicle and the load is a battery of the electric vehicle.

* * * * *